(12) United States Patent
Lin

(10) Patent No.: US 6,283,599 B1
(45) Date of Patent: Sep. 4, 2001

(54) PROJECTOR WITH ADJUSTABLE BRIGHTNESS AND UNIFORMITY

(75) Inventor: Rung-De Lin, Yunlin Hsien (TW)

(73) Assignee: Acer Peripherals, Inc., Taoyuan (TW)

( * ) Notice: Subject to any disclaimer, the term of this patent is extended or adjusted under 35 U.S.C. 154(b) by 0 days.

(21) Appl. No.: 09/507,726

(22) Filed: Feb. 22, 2000

(30) Foreign Application Priority Data

Mar. 19, 1999 (TW) ................................................ 088204190

(51) Int. Cl.⁷ .................................................. G03B 21/14
(52) U.S. Cl. ............................................................ 353/101
(58) Field of Search ..................................... 353/101, 100, 353/102; 349/61; 359/822, 823, 825, 694, 703, 704, 826; 348/742, 743

(56) References Cited

U.S. PATENT DOCUMENTS

| | | | |
|---|---|---|---|
| 4,988,188 | * | 1/1991 | Ohta ........................................ 353/101 |
| 5,029,992 | * | 7/1991 | Richardson ........................... 353/101 |
| 5,046,838 | * | 9/1991 | Iwasaki ................................. 353/101 |
| 5,467,146 | * | 11/1995 | Huang et al. ......................... 348/771 |
| 5,649,753 | * | 7/1997 | Masumoto ............................ 353/102 |
| 5,860,721 | * | 1/1999 | Bowron et al. ....................... 353/101 |
| 5,868,483 | * | 2/1999 | Okada et al. ......................... 353/101 |
| 6,054,832 | * | 4/2000 | Kunzman et al. ..................... 353/84 |

* cited by examiner

Primary Examiner—William Dowling
(74) Attorney, Agent, or Firm—Nath & Associates PLLC; Harold L. Novick

(57) ABSTRACT

A projection display device includes a lens module, a light source and an adjusting device. The lens module has a first lens and a second lens. The light source emits light through the first lens and the second lens to a surface. The adjusting device is used to change the distance between the first lens and the second lens, thereby adjusting brightness and uniformity of the projected pictures on the surface.

26 Claims, 6 Drawing Sheets

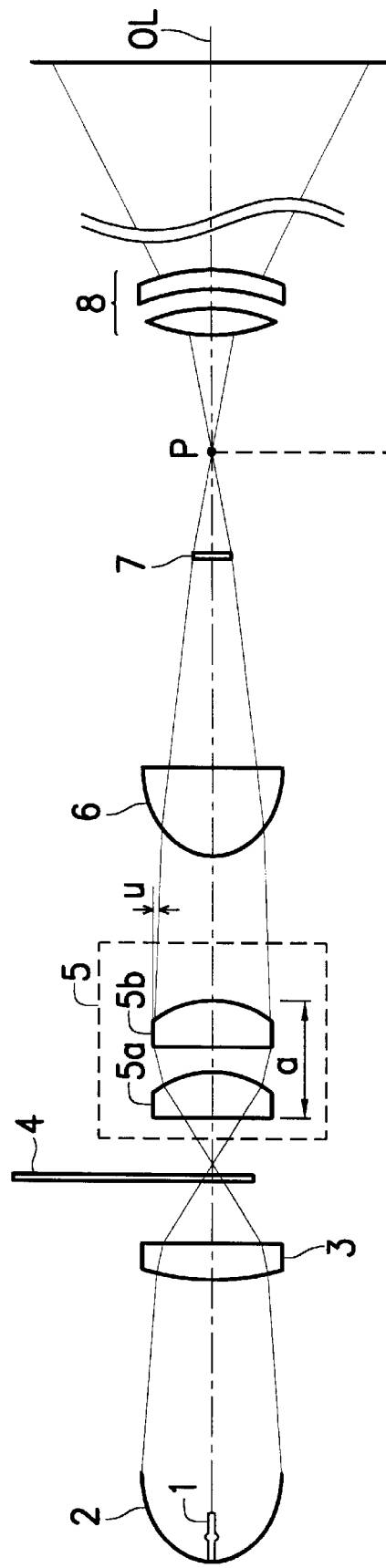
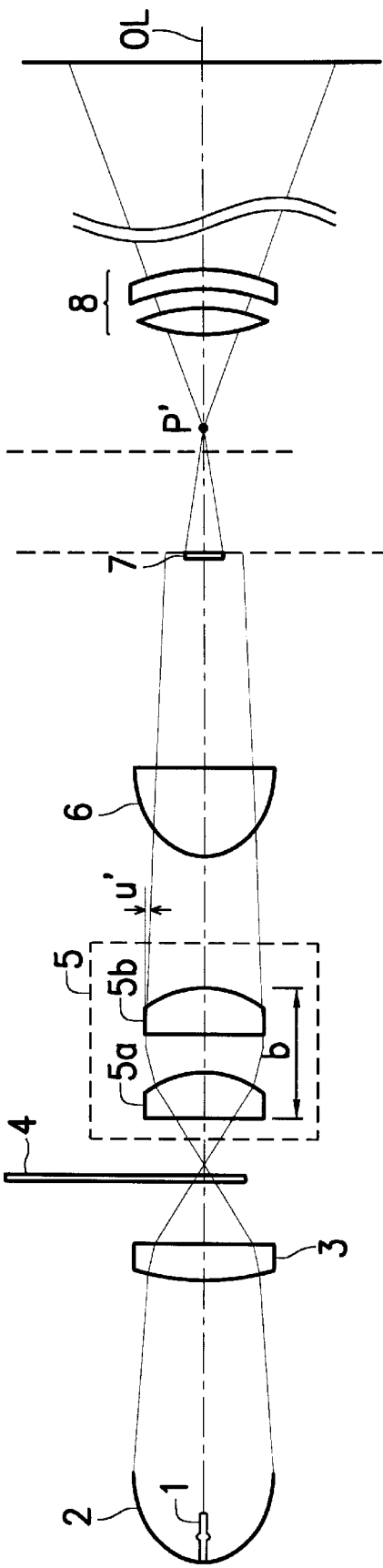
FIG. 2A
FIG. 2B

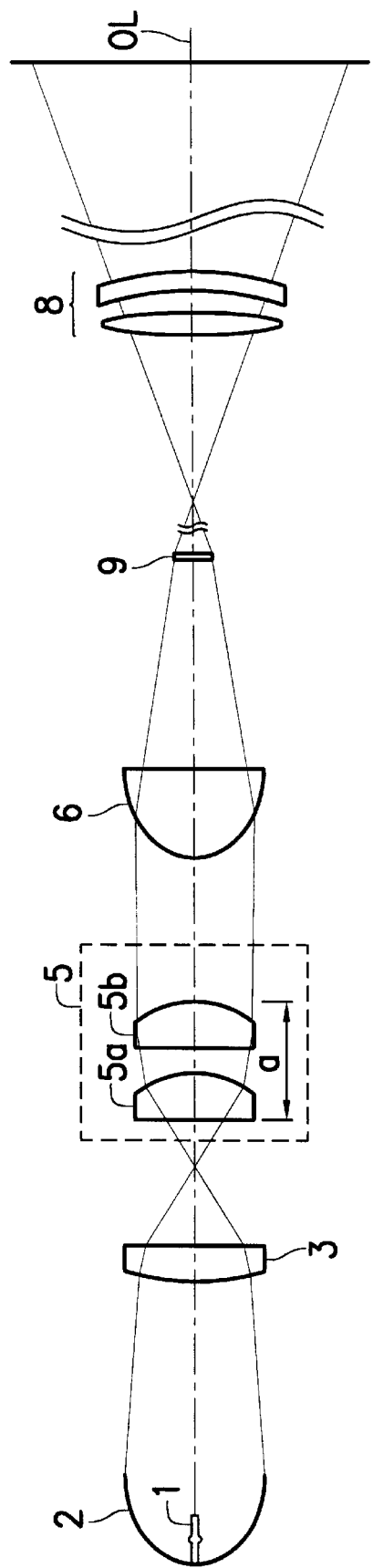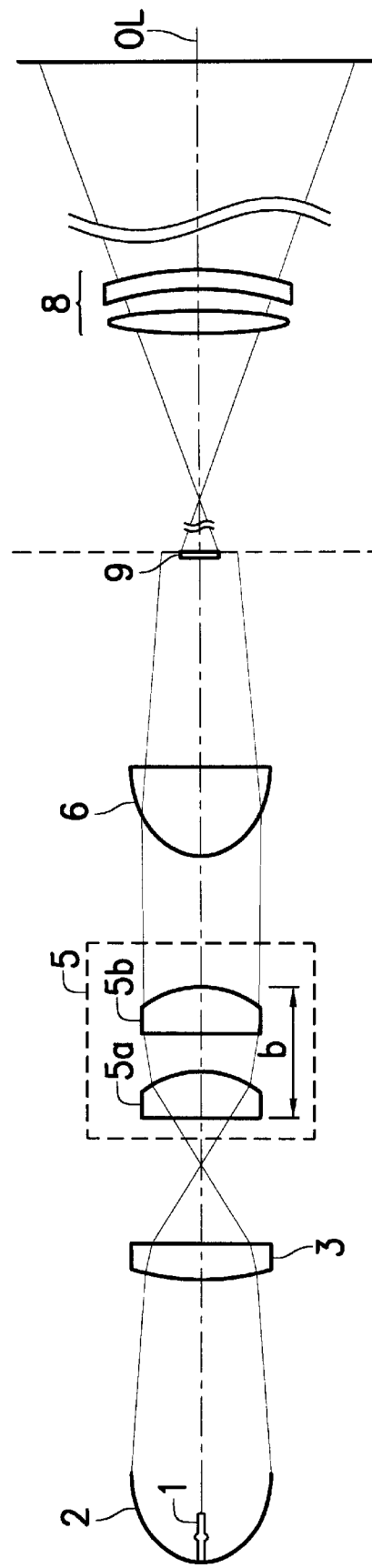
FIG. 3A
FIG. 3B

PROJECTOR WITH ADJUSTABLE BRIGHTNESS AND UNIFORMITY

BACKGROUND OF THE INVENTION

1. Field of the Invention

The present invention relates in general to a projector with adjustable brightness and uniformity.

2. Description of the Related Art

The portable digital projectors commercially available in the market include DLP (Digital Light Processing) projectors and LCD panel (Liquid Crystal Display panel) projectors. The two kinds of projectors have a common defect: either the picture brightness or the uniformity of brightness produced by the projectors is poor. FIGS. 1A and 1B depict this conundrum. In FIG. 1A, the brightness on the central portion of a projection surface (xy-plane) 100 is strong but the brightness on the side portions of the projection surface 100 is weak. That is, the brightness is good but the uniformity of brightness is poor. In FIG. 1B, the uniformity of brightness on the projection surface 100 is greatly improved. However, the brightness on the central portion of the projection surface 100 is weakened.

Generally, a portable digital projector is connected to a computer for a user to make a briefing, or is connected to an image output device such as a video tape recorder, a VCD player, an LD player or a DVD player to show films. In the case of a briefing, the user prefers the brightness rather than the uniformity of brightness because the briefing room generally is not dark enough. In the case of showing films, however, the user prefers the uniformity of brightness rather than the brightness so as to produce clear and beautiful pictures. Taking both cases into consideration, the projector manufacturers generally compromise between the brightness and the uniformity in design. As a result, the projection picture produced by the projector is not bright enough when the user makes a briefing, and the uniformity of brightness is not good enough when the user watches a film.

SUMMARY OF THE INVENTION

An object of the present invention is to provide a projection display device that solves the above-mentioned problem.

The projection display device of the present invention includes a lens module, a light source and an adjusting device. The lens module has a first lens and a second lens. The light source emits light through the first lens and the second lens to a projection surface. The adjusting device is used to change the distance between the first lens and the second lens, thereby adjusting the brightness and the uniformity of brightness on the projection surface to meet the needs of users in various applications.

In conclusion, the projection display device of the present invention allows the user to adjust the brightness and the uniformity of brightness so as to produce good projection quality in different situations.

BRIEF DESCRIPTION OF THE DRAWINGS

The present invention can be more fully understood by reading the subsequent detailed description and examples with references made to the accompanying drawings, wherein:

FIG. 2A depicts a projection display device of a first embodiment of the present invention, in which the distance between the lenses of a relay lens module is short;

FIG. 2B depicts a projection display device of the first embodiment of the present invention, in which the distance between the lenses of the relay lens module is long;

FIG. 3A depicts a projection display device of a second embodiment of the present invention, in which the distance between the lenses of a relay lens module is short;

FIG. 3B depicts a projection display device of a second embodiment of the present invention, in which the distance between the lenses of the relay lens module is long;

DETAILED DESCRIPTION OF THE PREFERRED EMBODIMENT

Figure 1A:
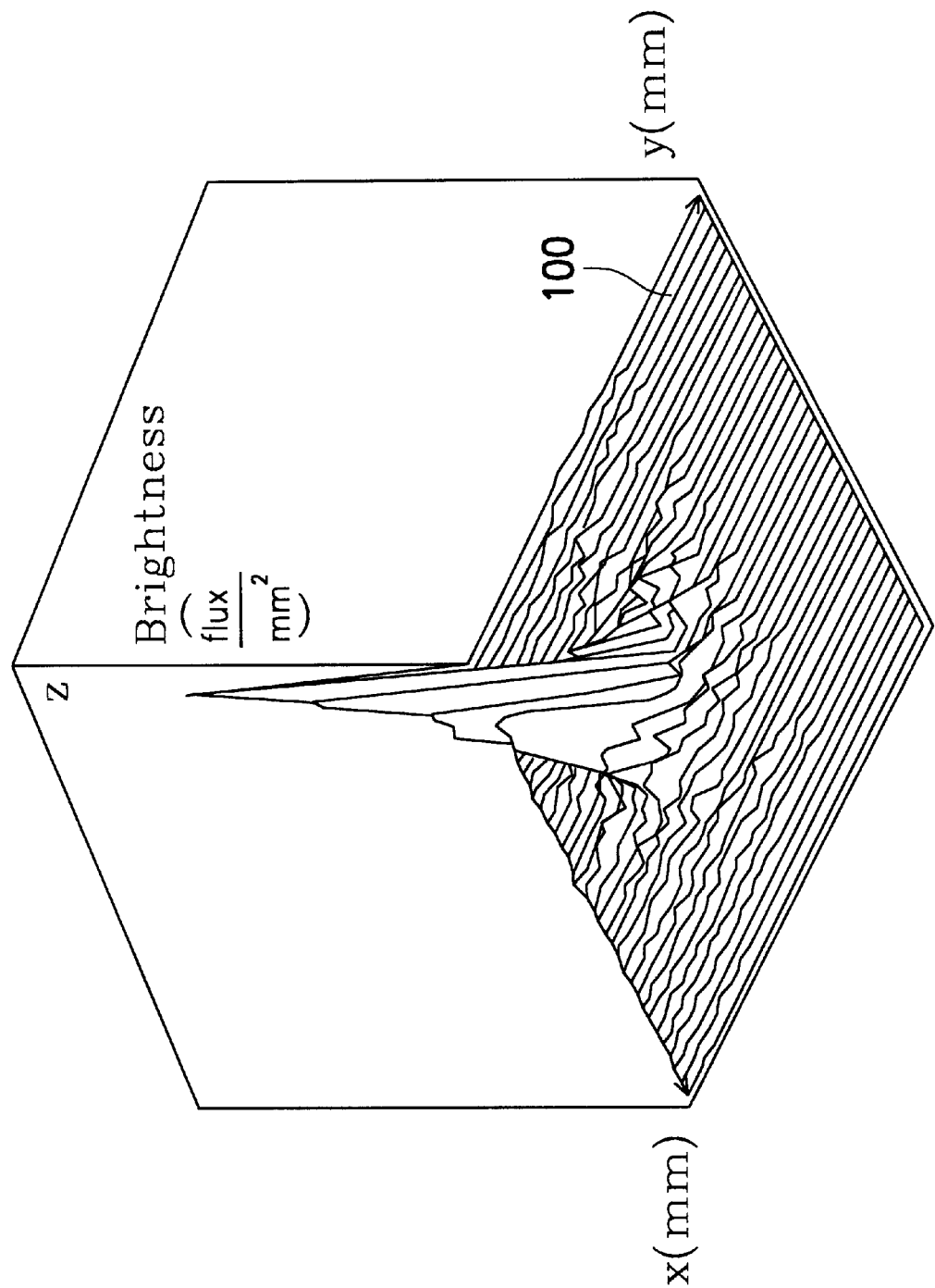
FIG. 1A depicts a case of good brightness but poor uniformity of brightness on a projection surface.
Figure 1B:
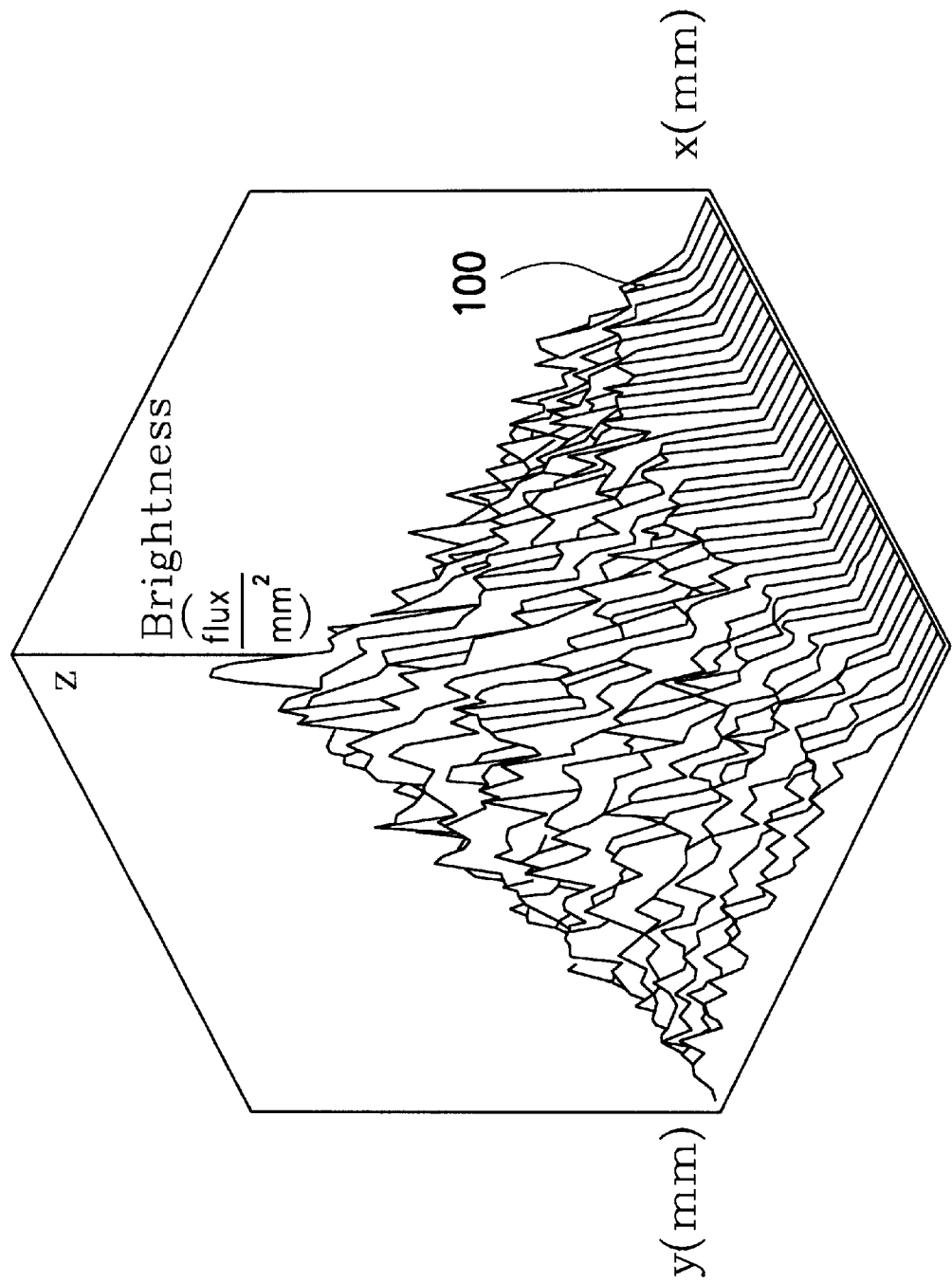
FIG. 1B depicts a case of good uniformity of brightness but poor brightness on a projection surface.

FIGS. 2A and 2B depict a projection display device of a first embodiment of the present invention, the arrangement of which is applicable to a DLP projector. The projection display device includes a lamp 1, a reflector 2, a front converging lens 3, a color wheel 4, a relay lens module 5, a rear converging lens 6, a digital micromirror device (DMD) 7 and a projection lens 8, all of which are arranged in series to form an optical path (OL). It is noted that the relay lens module 5 includes two lenses 5a, 5b.

In operation, the lamp 1 is turned on to emit light. The reflector 2 reflects the light, through the front converging lens 3, to the color wheel 4. The color wheel 4 generally is provided in a color projector and consists of three filters for generating red, green and blue lights. As soon as the lamp 1 is turned on, the color wheel 4 is rotated at a predetermined speed so that the light passing therethrough is filtered to alternately generate red, green and blue lights. Furthermore, the speed of rotation of the color wheel 4 is adjustable.

The colored light generated by the color wheel 4 goes through the relay lens module 5 and the rear converging lens 6 and then arrives at the digital micromirror device 7. In the present invention, the distance between the two lenses 5a, 5b of the relay lens module 5 is adjustable by using an adjusting means. The adjusting means will be introduced later.

The lenses 5a, 5b of the relay lens module 5 are converging lenses and thus the power of the lenses 5a, 5b are positive. If the distance (indicated by symbol "a") between the two lenses 5a, 5b of the relay lens module 5 is short as shown in FIG. 2A, then the total power of the lenses 5a, 5b is great. Thereby, the emergent angle (indicated by symbol "u") of the light is also great, so that the light beam is narrow while passing through the DMD 7 (the light beam is focused at the position P). As a result, the brightness is strong on the central portion of the DMD 7 but rapidly decreases in the directions away from the central portion of the DMD 7. The uniformity of the brightness on the whole DMD 7 is not so good.

Now referring to FIG. 2B, if the distance (indicated by symbol "b") between the two lenses 5a, 5b of the relay lens module 5 is long (b>a), then the total power of the lenses 5a, 5b is small. Thereby, the emergent angle (u') of the light is also small. Then, the light beam is wide while passing through the DMD 7 (the light beam is focused at the position P' and the position P' is behind the position P shown in FIG. 2A). As a result, the brightness on the central portion of the DMD 7 is decreased, but the brightness on the side portions of the DMD 7 is increased. The uniformity of the brightness on the whole DMD 7 is improved.

In contrast to the conventional projection display device in which the distance between the lenses of the relay lens module is fixed, the projection display device of the present invention allows the user to adjust the distance between the lenses 5a, 5b so as to selectively improve the brightness or the uniformity of brightness. Therefore, the projection display device of the present invention always provides the best effect in various operating situations.

FIGS. 3A and 3B depict a projection display device of a second embodiment of the present invention, the arrangement of which is applicable to an LCD panel projector. The projection display device includes a lamp 1, a reflector 2, a front converging lens 3, a relay lens module 5, a rear converging lens 6, a liquid crystal display (LCD) panel 9 and a projection lens 8, all of which are arranged in series to form an optical path (OL). The relay lens module 5 includes two lenses 5a, 5b.

In operation, the lamp 1 is turned on to emit light. The reflector 2 reflects the light, through the front converging lens 3, the relay lens module 5 and the rear converging lens 6, to the LCD panel 9. If the distance (indicated by symbol "a") between the two lenses 5a, 5b of the relay lens module 5 is short as shown in FIG. 3A, then the light beam is narrow while passing through the LCD panel 9. As a result, the brightness is strong on the central portion of the LCD 9 but is rapidly decreased in the directions away from the central portion of the LCD 9. The uniformity of the brightness on the whole LCD panel 9 is poor. On the other hand, if the distance (indicated by symbol "b") between the two lenses 5a, 5b of the relay lens module 5 is long (b>a) as shown in FIG. 3B, then the light beam is wide while passing through the LCD panel 9. As a result, the brightness on the central portion of the LCD panel 9 is decreased, but the brightness on the side portions of the LCD panel 9 is increased. The uniformity of the brightness on the whole LCD panel 9 is thus improved.

For both of the DLP projector and LCD panel projector, the present invention allows the user to selectively improves the brightness or the uniformity of brightness via adjusting the distance between the lenses 5a, 5b of the relay lens module 5. The use of the projection display device of the present invention is more flexible than a conventional one.

Figure 4A:
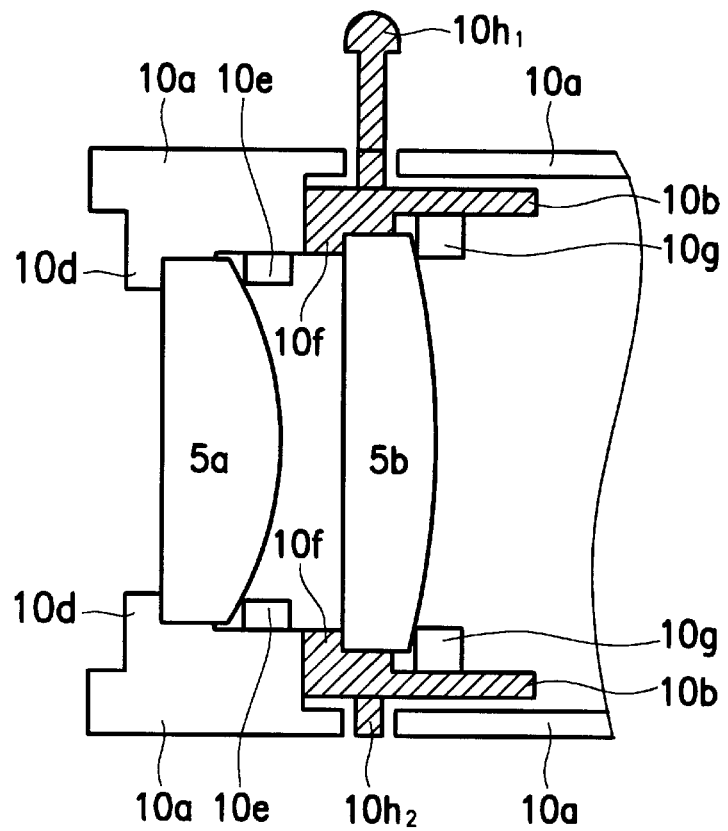
FIG. 4A is a sectional view of a means for adjusting the distance between the lenses of the relay lens module in accordance with an example of the present invention.
Figure 4B:
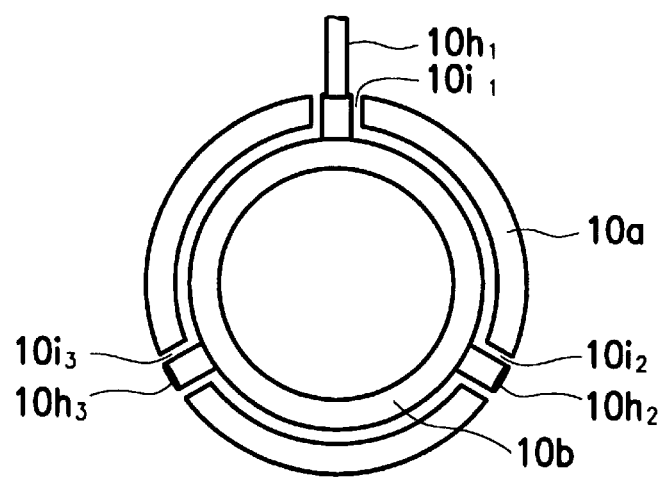
FIG. 4B is a side view of FIG. 4A.
Figure 4C:
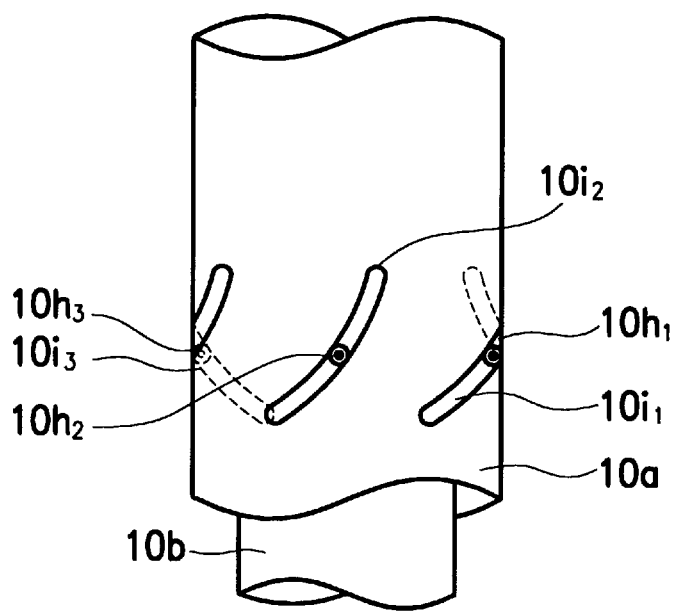
FIG. 4C is a perspective diagram of FIG. 4A.
Figure 4D:
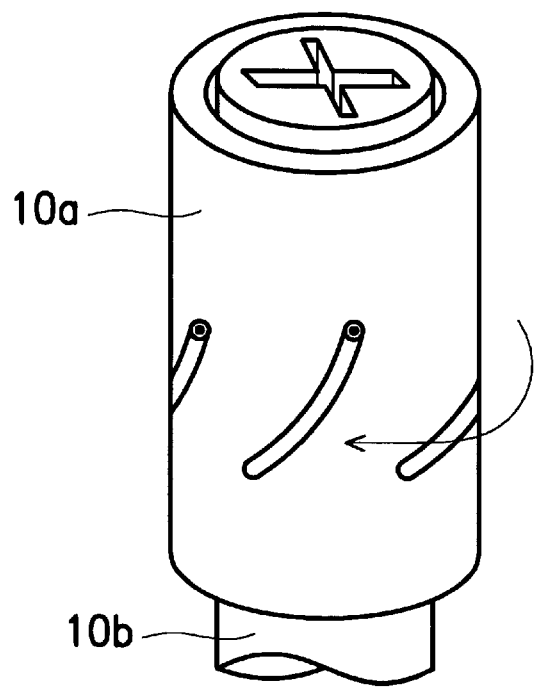
FIG. 4D is also a perspective diagram of FIG. 4A, in which, however, the inner cylinder is rotated with respect to the outer cylinder to adjust the distance between the lenses of the relay lens module.

Now, the means for adjusting the distance between the lenses 5a, 5b of the relay lens module 5 is introduced. Referring to FIGS. 4A, 4B and 4C, the adjusting means has an outer cylinder 10a and an inner cylinder 10b coaxially received in the outer cylinder 10a. The outer cylinder 10a has a flange 10d and an elastic ring 10e inside for holding the lens 5a therebetween, while the inner cylinder 10b also has a flange 10f and an elastic ring 10g inside for holding the lens 5b therebetween. Furthermore, three posts $10h_1$, $10h_2$, $10h_3$ spaced 120° to each other and equipped with wheels which are attached onto the inner cylinder 10b, while three curved grooves $10i_1$, $10i_2$, $10i_3$ are provided on the outer cylinder 10a for receiving the wheels of the posts $10h_1$, $10h_2$, $10h_3$. In operation, the user moves the post $10h_1$ along the groove $10i_1$ so that the inner cylinder 10b is rotated and axially moved with respect to the outer cylinder 10a as shown in FIG. 4D, with the wheels rolling in the grooves.

Thereby, the lens 5b is moved far away from or close to the lens 5a. As a result, the user can easily adjust the distance between the lenses 5a, 5b as he wishes by moving the post $10h_1$.

It is understood that the projection display device of the present invention allows the user to adjust the brightness and the uniformity of brightness so as to produce good projection quality in different application situations.

Furthermore, the present invention does not use additional lenses to adjust the brightness and the uniformity of brightness. Instead, the present invention uses a simple mechanism to adjust the distance between the lenses of the relay lens module, which is relatively inexpensive.

Furthermore, in this preferred embodiment the distance between the lenses of the relay lens module is changed in the manner of stepless adjustment as disclosed above. However, it is understood that stepped adjustment is applicable to the present invention.

While the invention has been described by way of example and in terms of the preferred embodiment, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A projection display device, including:
    a lens module having a first lens and a second lens, wherein at least the first lens or the second lens is movably disposed;
    a light source emitting a light beam;
    a surface for receiving light from the light source through the lens module; and
    an adjusting device for adjusting a distance between the first and second lenses, wherein increasing the distance between the first and second lenses increases the uniformity of brightness but decreases the brightness of the light received by the surface, while decreasing the distance between the first and second lenses decreases the uniformity of brightness but increases the brightness of light received by the surface.

2. A projection display device as claimed in claim 1, further including a first converging lens for converging the light transmitted from the light source to the lens module.

3. A projection display device as claimed in claim 2, further including a second converging lens for converging the light transmitted from the lens module to the surface.

4. A projection display device as claimed in claim 1, wherein the means for adjusting the distance between the first lens and the second lens includes:
    a first cylinder holding the first lens;
    a second cylinder coaxially received in the first cylinder to hold the second lens; and
    means for axially moving the second cylinder with respect to the first cylinder, thereby changing the distance between the first lens and the second lens.

5. A projection display device as claimed in claim 4, wherein at least one groove is provided on the first cylinder, and the means for axially moving the second cylinder with respect to the first cylinder includes at least one post connected to the second cylinder and movably constrained in the groove.

6. A projection display device as claimed in claim 5, wherein the means for axially moving the second cylinder with respect to the first cylinder further includes a wheel attached to the post and received in the groove, and the wheel rolls in the groove when the post is pushed to move the second cylinder.

7. A projection display device as claimed in claim 1, wherein the projection display device is a LCD panel projector.

8. A projection display device as claimed in claim 1, wherein the projection display device is a DLP projector.

9. A projection device as claimed in claim 1, wherein the surface for receiving light is smaller in area than a cross-sectional area of the light beam in a plane containing the surface when the distance between the first and second lenses is at a maximum.

10. A projection device as claimed in claim 1, wherein the surface for receiving light is equal in area to a cross-sectional area of the light beam in a plane containing the surface when the distance between the first and second lenses is at a minimum.

11. A projection display device, including:
   a color wheel;
   a lens module having a first lens and a second lens, wherein at least the first lens or the second lens is movably disposed;
   a digital micromirror device;
   a light source for emitting a light beam through the color wheel and the lens module to the digital micromirror device; and
   an adjusting device for adjusting a distance between the first and second lenses, wherein increasing the distance between the first and second lenses increases the uniformity of brightness but decreases the brightness of the light received by the digital micromirror device, while decreasing the distance between the first and second lenses decreases the uniformity of brightness but increases the brightness of light received by the digital micromirror device.

12. A projection device as claimed in claim 11, wherein the digital micromirror device is smaller in area than a cross-sectional area of the light beam in a plane containing the digital micromirror device when the distance between the first and second lenses is at a maximum.

13. A projection device as claimed in claim 11, wherein the digital micromirror device is equal in area to a cross-sectional area of the light beam in a plane containing the digital micromirror device when the distance between the first and second lenses is at a minimum.

14. A projection display device as claimed in claim 11, further including a first converging lens for converging the light transmitted from the light source to the color wheel.

15. A projection display device as claimed in claim 11, further including a second converging lens for converging the light transmitted from the lens module to the digital micromirror device.

16. A projection display device as claimed in claim 11, wherein the means for adjusting the distance between the first lens and the second lens includes:
   a first cylinder holding the first lens;
   a second cylinder coaxially received in the first cylinder to hold the second lens; and
   means for axially moving the second cylinder with respect to the first cylinder, thereby changing the distance between the first lens and the second lens.

17. A projection display device as claimed in claim 16, wherein at least one groove is provided on the first cylinder, and the means for axially moving the second cylinder with respect to the first cylinder includes at least one post connected to the second cylinder and movably constrained in the groove.

18. A projection display device as claimed in claim 17, wherein the means for axially moving the second cylinder with respect to the first cylinder further includes a wheel attached to the post and received in the groove, and the wheel rolls in the groove when the post is pushed to move the second cylinder.

19. A projection display device having adjustable brightness and uniformity of brightness, including:
   a lens module having a first lens and a second lens, wherein at least the first lens or the second lens is movably disposed;
   a liquid crystal display panel;
   a light source for emitting a light beam through the first and second lenses of the lens module to the liquid crystal display panel; and
   an adjusting device for adjusting a distance between the first and second lenses, wherein increasing the distance between the first and second lenses increases the uniformity of brightness but decreases the brightness of the light received by the liquid crystal display panel, while decreasing the distance between the first and second lenses decreases the uniformity of brightness but increases the brightness of light received by the liquid crystal display panel.

20. A projection device as claimed in claim 19, wherein the liquid crystal display panel is smaller in area than a cross-sectional area of the light beam in a plane containing the liquid crystal display panel when the distance between the first and second lenses is at a maximum.

21. A projection device as claimed in claim 19, wherein the liquid crystal display panel is equal in area to a cross-sectional area of the light beam in a plane containing the liquid crystal display panel when the distance between the first and second lenses is at a minimum.

22. A projection display device as claimed in claim 19, further including a first converging lens for converging the light transmitted from the light source to the lens module.

23. A projection display device as claimed in claim 19, further including a second converging lens for converging the light transmitted from the lens module to the liquid crystal display panel.

24. A projection display device as claimed in claim 19, wherein the means for adjusting the distance between the first lens and the second lens includes:
   a first cylinder holding the first lens;
   a second cylinder coaxially received in the first cylinder to hold the second lens; and
   means for axially moving the second cylinder with respect to the first cylinder, thereby changing the distance between the first lens and the second lens.

25. A projection display device as claimed in claim 24, wherein at least one groove is provided on the first cylinder, and the means for axially moving the second cylinder with respect to the first cylinder includes at least one post connected to the second cylinder and movably constrained in the groove.

26. A projection display device as claimed in claim 25, wherein the means for axially moving the second cylinder with respect to the first cylinder further includes a wheel attached to the post and received in the groove, and the wheel rolls in the groove when the post is pushed to move the second cylinder.

* * * * *